(12) United States Patent
Bergner et al.

(10) Patent No.: US 9,805,051 B2
(45) Date of Patent: Oct. 31, 2017

(54) SYNCHRONIZATION AND STRATEGIC STORAGE OF MULTIPLE VERSIONS OF A FILE

(71) Applicant: salesforce.com, inc., San Francisco, CA (US)

(72) Inventors: Emil Bergner, Walnut Creek, CA (US); Miko A. Bose, San Francisco, CA (US); James Johnson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 315 days.

(21) Appl. No.: 14/482,952

(22) Filed: Sep. 10, 2014

(65) Prior Publication Data
US 2016/0070717 A1    Mar. 10, 2016

(51) Int. Cl.
*G06F 17/30* (2006.01)
(52) U.S. Cl.
CPC .............................. *G06F 17/30174* (2013.01)
(58) Field of Classification Search
USPC ......... 707/638.615, 769, 797, 748, 803, 807
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Sana Al Hashemi
(74) *Attorney, Agent, or Firm* — Weaver Austin Villeneuve & Sampson LLP

(57) ABSTRACT

Disclosed are some examples of systems, methods and storage media for synchronizing files between a user's computer and a remote system, and more specifically, to strategically storing updated versions of a file on the remote system. In some implementations, a system is capable of receiving a request including an updated version of a file. The system is additionally capable of identifying a version type of the updated version, identifying a current version of the file stored in one or more storage devices, and determining, based on the version type of the updated version, whether to store the updated version in the one or more storage devices as a new version or to replace the current version with the updated version. The system is further capable of storing the updated version in the one or more storage devices based on the determination.

23 Claims, 10 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,498,994 B2 | 7/2013 | Prabaker et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,221 B2 | 6/2014 | Prabaker et al. |
| 9,171,180 B2 | 10/2015 | Prabaker et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0079126 A1* | 3/2012 | Evans .................. G06F 9/4443 709/230 |
| 2012/0233137 A1 | 9/2012 | Jakobson et al. |
| 2012/0290407 A1 | 11/2012 | Hubbard et al. |
| 2013/0046779 A1* | 2/2013 | Gagliardi ............ G06F 11/3612 707/769 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0326034 A1* | 12/2013 | Shaik ................... H04L 41/082 709/223 |
| 2014/0006352 A1* | 1/2014 | Sachs ....................... G06F 8/71 707/638 |
| 2014/0172925 A1 | 6/2014 | Goldbrenner et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

"Does Dropbox always upload/download the entire file any time a change is made" *Dropbox Help Center*, 1 page, downloaded Jun. 4, 2015.

"Enable and configure versioning for a list or library" Microsoft Office Help Center, 6 pages, downloaded Jun. 4, 2015.

"Google Drive: Access and organize your files" *Google Apps for Work*, 14 pages, Aug. 25, 2014.

"How does syncing work" Dropbox Help Center, 2 pages, downloaded Jun. 4, 2015.

"How to Track Your Files and File Versions (Version History)" *Box Help*, 3 pages, downloaded Jun. 4, 2015.

"Introduction to Versioning" *Microsoft Office Help Center*, 4 pages, downloaded Jun. 4, 2015.

"Microsoft SharePoint 2010 Evaluation Guide" SharePoint 2010 Overview, 43 pages, 2010.

"Versions Web Service" *Microsoft Developer Network*, 1 page, downloaded Jun. 4, 2015.

"What's the difference between a conflicted copy and my version of a file?" *Dropbox Help Center*, 1 page, downloaded Jun. 4, 2015.

"Will files I put in Dropbox be synced across other machines even if they're offline?" *Dropbox Help Center*, 1 page, downloaded Jun. 4, 2015.

* cited by examiner

SYNCHRONIZATION AND STRATEGIC STORAGE OF MULTIPLE VERSIONS OF A FILE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to synchronizing files between a user's computer and another computing system, and more specifically, to strategically storing updated versions of a file in a remote computing system.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows an example of a group feed on a group profile page according to some implementations.

FIG. 4 shows an example of a record feed on a record profile page according to some implementations.

FIG. 8 shows an example of a "File Details" page viewable by selecting a file in the Files page of FIG. 8 according to some implementations.

FIG. 9 shows an example of a "Version History" window viewable by selecting a "Show all Versions" GUI element in the File Details page of FIG. 9 according to some implementations.

DETAILED DESCRIPTION

Figure 1A:
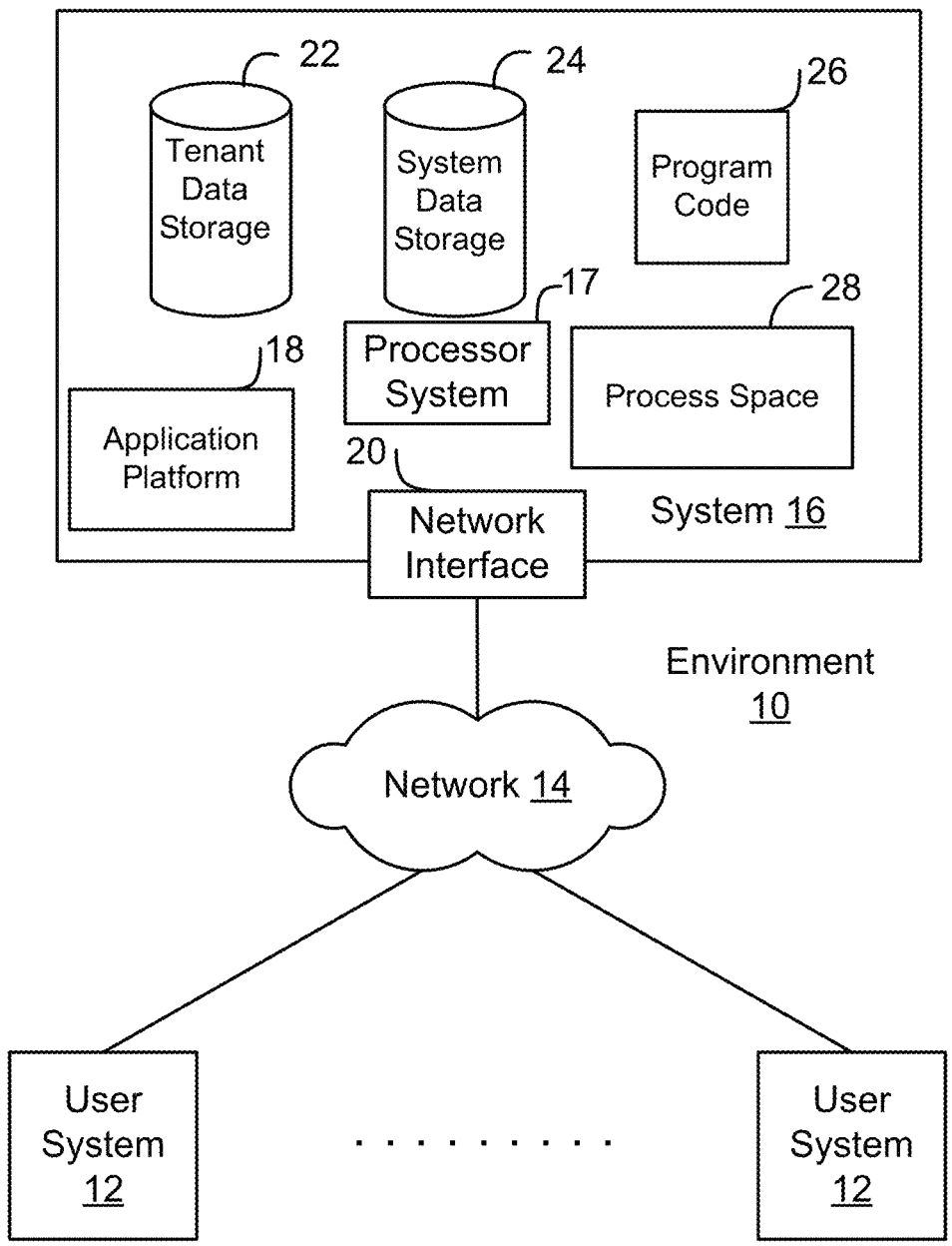
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for synchronizing files between a user's computing device and a remote system, and more specifically, to strategically storing updated versions of a file on the remote system. In some implementations, a client-side synchronization engine automatically uploads updated versions of a file stored in a synchronization folder responsive to the saving of the updated versions in the synchronization folder. In some implementations, the client-side synchronization engine communicates the updated version to a versioning application or application programming interface (API), which then determines whether to save the updated version in a database as a new version or whether to replace a current version in the database with the updated version. Such implementations facilitate the strategic or efficient storage of multiple versions of a file in a cloud-based system by storing significant, important or other useful current and historic versions of a file while not storing other versions of the file that are not as significant, important or useful. In some implementations, a user also can share a file, or an updated version of a file, with other users to facilitate collaboration on the file. Some implementations facilitate collaboration by reducing the number of steps necessary to maintain updated versions of files in the cloud-based system.

In one example use scenario, an original authoring user creates a file (for example, a Microsoft® Word document) using a suitable client-side application. The user then saves the file to a synchronization folder in the user's computing device. Responsive to detecting the saving of the file in the synchronization folder, a client-side synchronization engine uploads the file to an application server. A versioning API then stores the file in a database. The authoring user then shares the file with other users, for example, other users of a team or group or other collaborators on a project. The other users can subsequently download the shared file to their computing devices and respective synchronization folders. The other users can then make changes or add comments to the file and save their respective updated version to their respective synchronization folders. Responsive to the saving, the respective synchronization engines upload the other users' updated versions to the application server and the versioning API. In some implementations, each different user's updated version is stored as a separate version in the database.

The original authoring user can then view the other users' updated versions, for example, by downloading and opening the other users' updated versions in the user's computing device or by previewing the other users' updated versions via a web interface provided by the application server. The original authoring user can then open the version stored in the original authoring user's synchronization folder and reconcile this version with the other users' updated versions (for example, by integrating other users' changes in his file or more generally by updating his file to reflect other users' changes or comments). When the original authoring user saves the integrated updated version in his synchronization folder, the synchronization engine uploads the updated version to the application server and the versioning API. The versioning API then determines whether to store the updated version as a new version in the database or whether to replace a previous version with the updated version. The original authoring user can then share the updated version (or it may be shared automatically) with the other users. The workflow can repeat as the sharing of, collaboration on, and updating of the file progress.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif.

salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
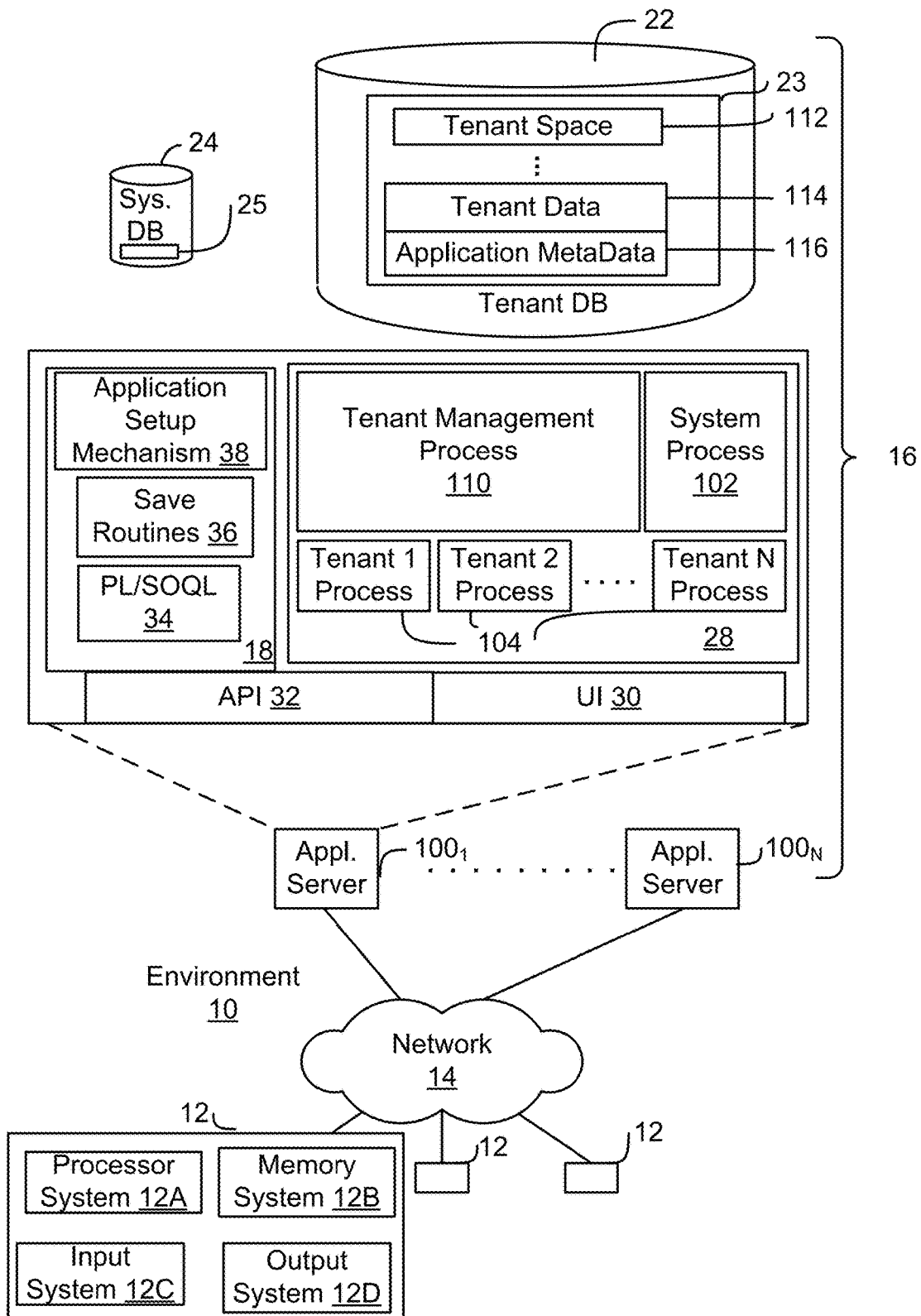
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
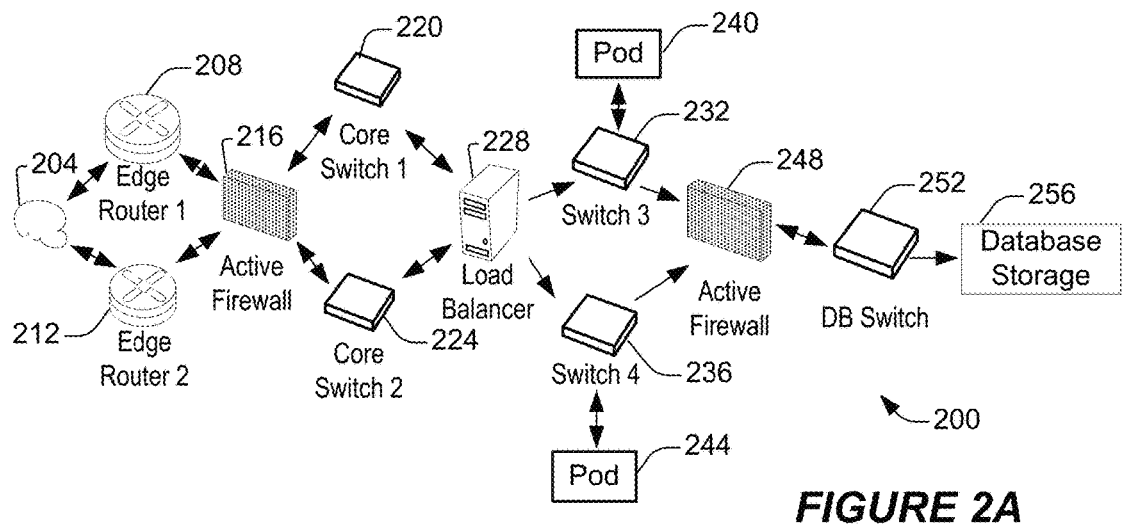
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
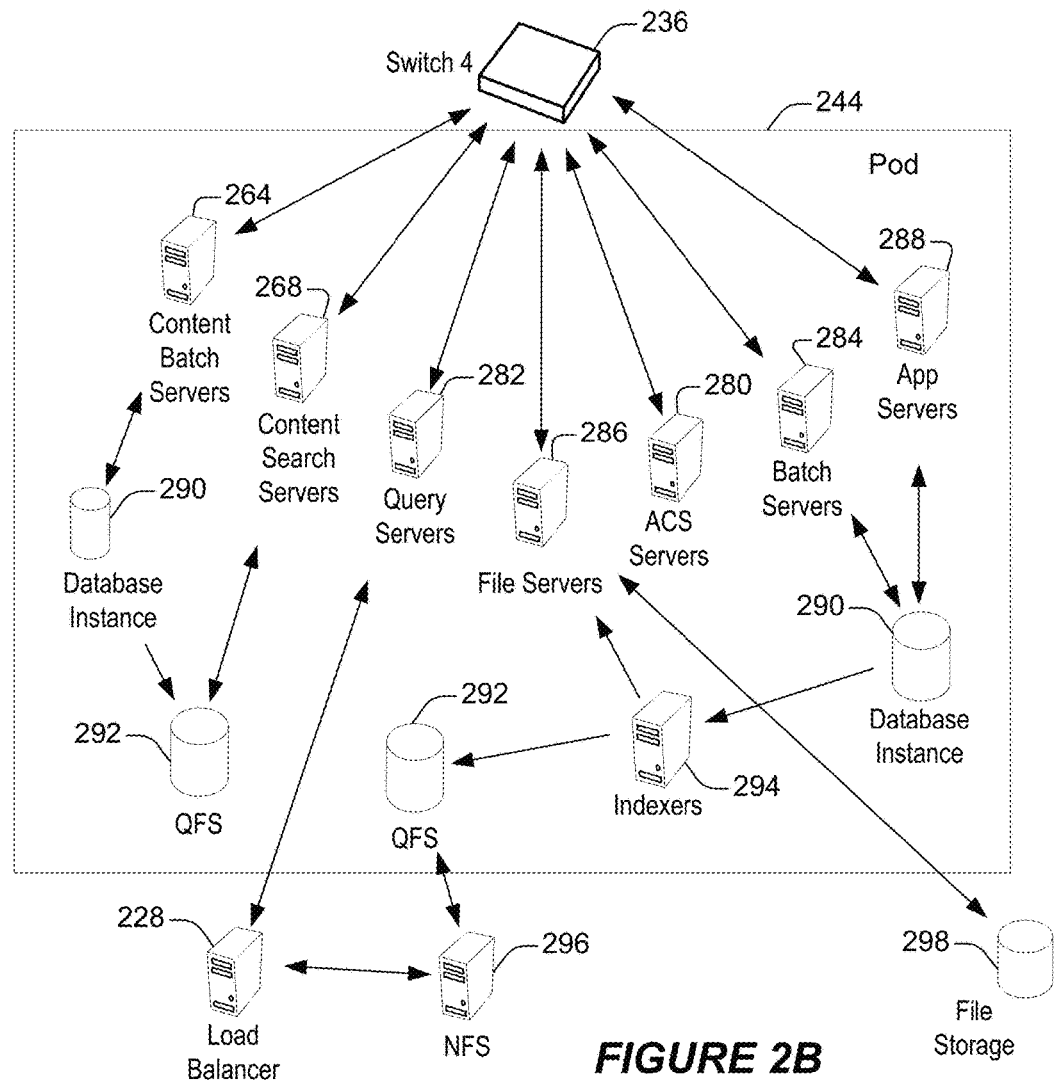
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Figure 3:
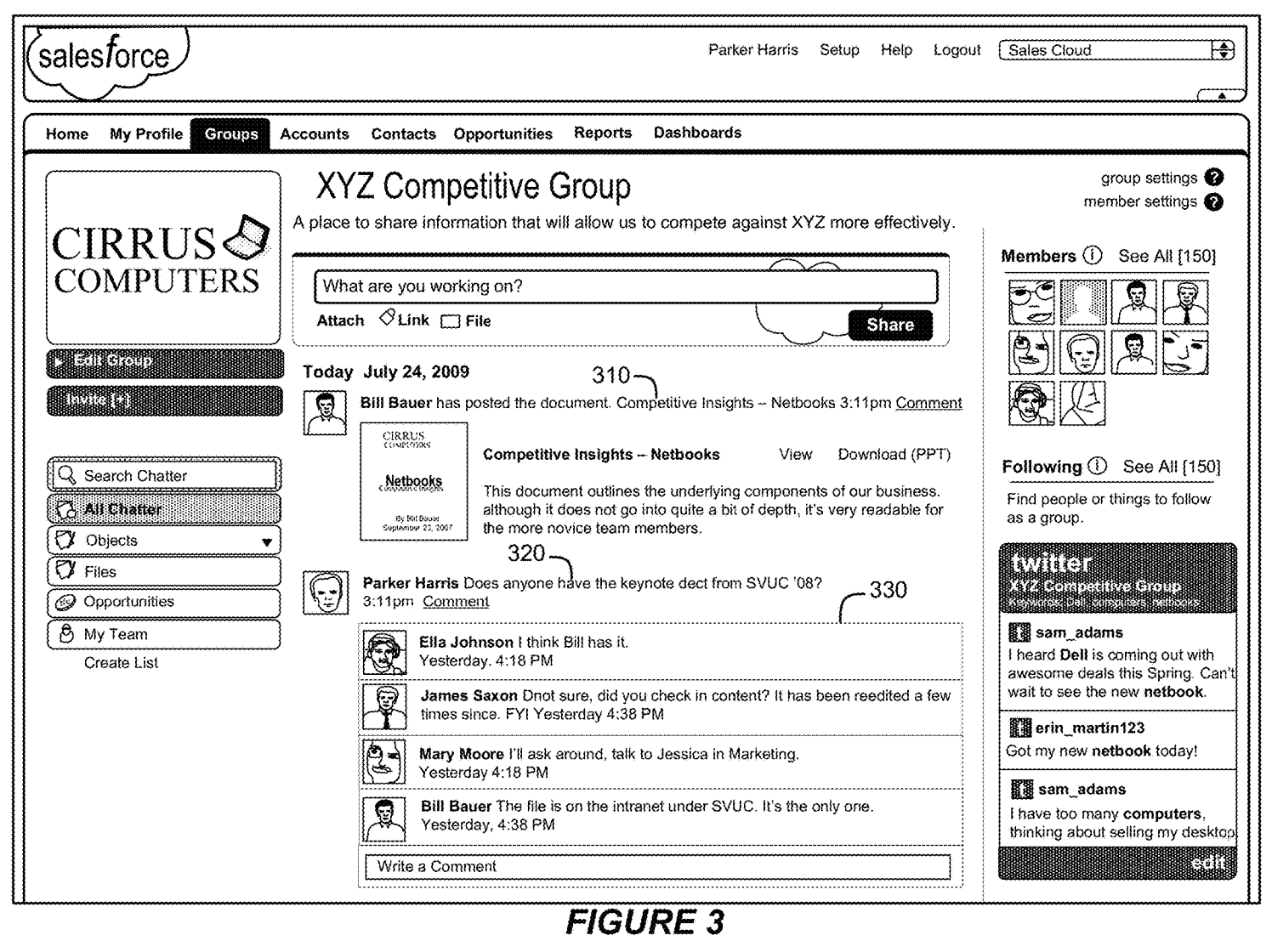

FIG. 3 shows an example of a group feed on a group profile page according to some implementations. As shown, a feed item 310 shows that a user has posted a document to the group feed. The text "Bill Bauer has posted the document Competitive Insights" can be generated by the database system in a similar manner as feed-tracked updates about a record being changed. A feed item 320 shows a post to the group, along with comments 330 from Ella Johnson, James Saxon, Mary Moore and Bill Bauer.

Figure 4:
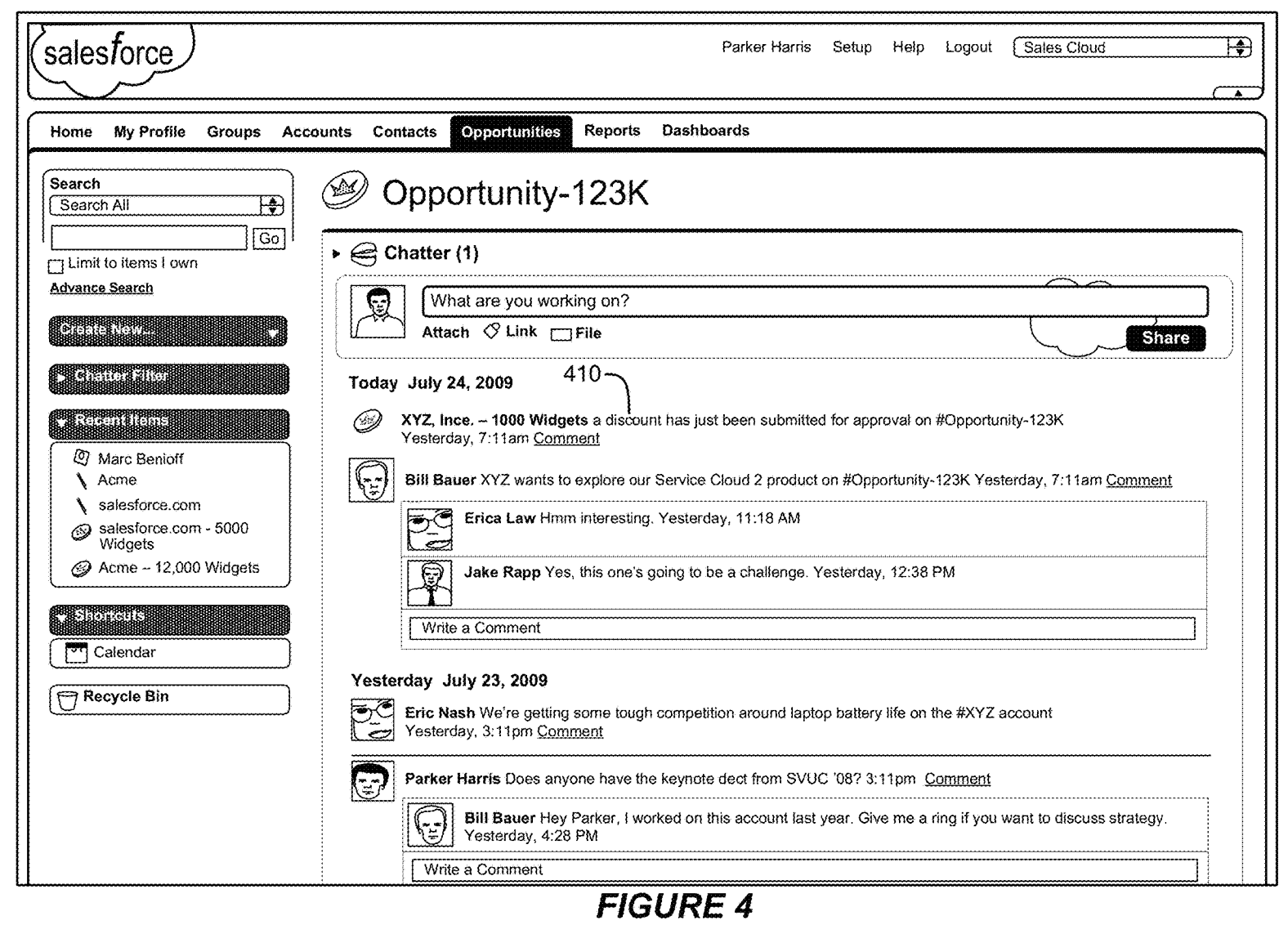

FIG. 4 shows an example of a record feed on a record profile page according to some implementations. The record feed includes a feed-tracked update, a post, and comments. Feed item 410 shows a feed-tracked update based on the event of submitting a discount for approval. Other feed items show posts, for example, from Bill Bauer, made to the record and comments, for example, from Erica Law and Jake Rapp, made on the posts.

III. Version Synchronization and Storage

As described above, in some implementations, the database system 16 includes application servers $100_1$-$100_N$. In some implementations, one or more of the application servers $100_1$-$100_N$ implement or host a core application for providing various on-demand or cloud-computing services described herein. In some implementations, one or more of the same or different application servers $100_1$-$100_N$ implement or host a "versioning" application programming interface (API). In some implementations, the versioning API executes in conjunction with the core application. In some implementations, the core application includes the versioning API; that is, the versioning API executes within the core application.

In some implementations, the versioning API includes an algorithm that applies one or more rules, heuristics or experience-based analytical techniques (referred to collectively herein as "heuristics") for determining whether to replace a current version of a file stored in the tenant database 22 with an updated version, or to store the updated version as a new version, responsive to receiving an updated version. In some implementations, the versioning API is "agnostic" with respect to users; in other words, the versioning API is capable of determining when to replace a current version and when to create a new version of a shared file regardless of the number and identities of authoring users or collaborators of/on the file. In some implementations, the versioning API is agnostic with respect to computing devices; in other words, the versioning API is capable of determining when to replace a current version and when to create a new version of a shared file regardless of the number of computing devices one or more users of the computing devices use to update the file. Thus, the versioning API is capable of determining when to replace a current version and when to create a new version of a shared file regardless of the authoring users and computing devices responsible for the making the changes to and communicating the updated version.

Some implementations described below relate to a client-side synchronization engine (also referred to herein as a "sync engine" or "sync client"). In some implementations, the sync engine is an application that executes as a background process in a client-side computing device, for example, a user's desktop computer, laptop computer, tablet computer, smartphone, gaming device or system, or other portable or handheld computing device (referred to collectively herein as "computing device." In some implementations, the sync engine begins executing automatically when the respective computing device is powered on. In some other implementations, the sync engine begins executing automatically when a user using the computing device logs in to the database system 16 or when the user opens a file stored in a sync folder. The sync engine can be initially downloaded to the user's computing device when the user logs in to the database system 16 from the computing device for the first time. The sync engine also can be downloaded at some other time when synchronization services, including services provided in conjunction with the sync engine, are included in the services provided to the user by the database system 16 (for example, after such services are automatically added by administrators of the system or after a user's or an organization's selection to receive synchronization services).

When initially downloaded to a user's computing device, the sync engine creates a sync folder in the hard drive or other storage device used by the user's computing device. A user can save documents or other files (the terms "document" and "file" are used interchangeably herein) in the sync folder similar to typical file folders, for example, by "dragging and dropping" files from another folder or by selecting to save a file in the sync folder via a client-side application in which the file is opened (for example, a Microsoft® Office application such as Microsoft® Word or Microsoft® Excel, an iWork® Suite application, a portable document format (PDF) rendering application such as Adobe® Acrobat®, or a computer-aided design (CAD) application, among other possibilities). In some implementations, a user also can select to download files from the database system 16 (for example, from the tenant database 22) to the user's computing device and save the downloaded files in the sync folder.

The files saved in the sync folder also are stored in the cloud in the database system 16, for example, in the tenant database 22. For example, when a file is stored in the sync folder for the first time, the sync engine can push the file to the application servers $100_1$-$100_N$ (hereinafter referred to collectively as the "application server 100"), which can then store an identical version of the file in the tenant database 22. When a user makes changes to the file in the sync folder and saves the changes in the sync folder, the sync engine pushes the updated version to the application server 100. More specifically, when a user opens a document (for example, a Microsoft Word document, a PDF document, or a CAD document) stored in the sync folder, and subsequently changes and saves the document (for example, by typing "Ctrl S" or clicking a "Save" button or other GUI element), the sync engine generates a request that includes the updated version and communicates the request to the application server 100. In this way, the application server 100 can store the updated version of the document on the server side, for example, in the tenant database 22. A user can open a document placed in the sync folder directly from the client-side sync folder as well as using any suitable client-side application that is capable of processing/rendering the document (for example, a user can open a synced Microsoft Word document via the Microsoft Word application stored and executing within the user's computing device). In other words, the sync engine enables the user to make changes to a file with a client-side application while ensuring that the updated version of the file also is stored in the application server 100.

In enterprise network implementations, a user who owns or who created, authored, originated or updated a file (referred to herein as an "authoring user"), can select to share the file, for example, by sharing the file with a record or a group. In some such implementations, the shared file is then viewable by subscribers to the record or by members of the group via the associated record feed or group feed, respectively. For example, the authoring user can share the file with a record or a group by posting the file to the respective record page or group page. When a user's file has been shared on a collaboration page, such as a record page or a group page, the user can, at a subsequent time, log in to the database system 16, navigate to the collaboration page, and select and view the file. Additionally, another authorized user, for example, a user that subscribes to the record or the group to which the file is shared, also can select and view the file. Such other authorized users can add feedback to the file, for example, by submitting a comment to the feed item where the file was posted or otherwise shared. In some implementations, other authorized users also can download the file, save it to their respective sync folders, makes changes to or comment in the file, and upload respective updated versions to the application server 100 (for example, using the sync engine). The authoring user can then open the file from the user's sync folder and incorporate the changes from the other updated versions or otherwise edit the file in view of the changes or comments made by the other users. In this way, the authoring user can generate an updated version based on the changes, comments or feedback from multiple other users. Again, when the authoring user selects to save the updated version of the file, the sync engine pushes the updated version to the application server 100.

Figure 5:
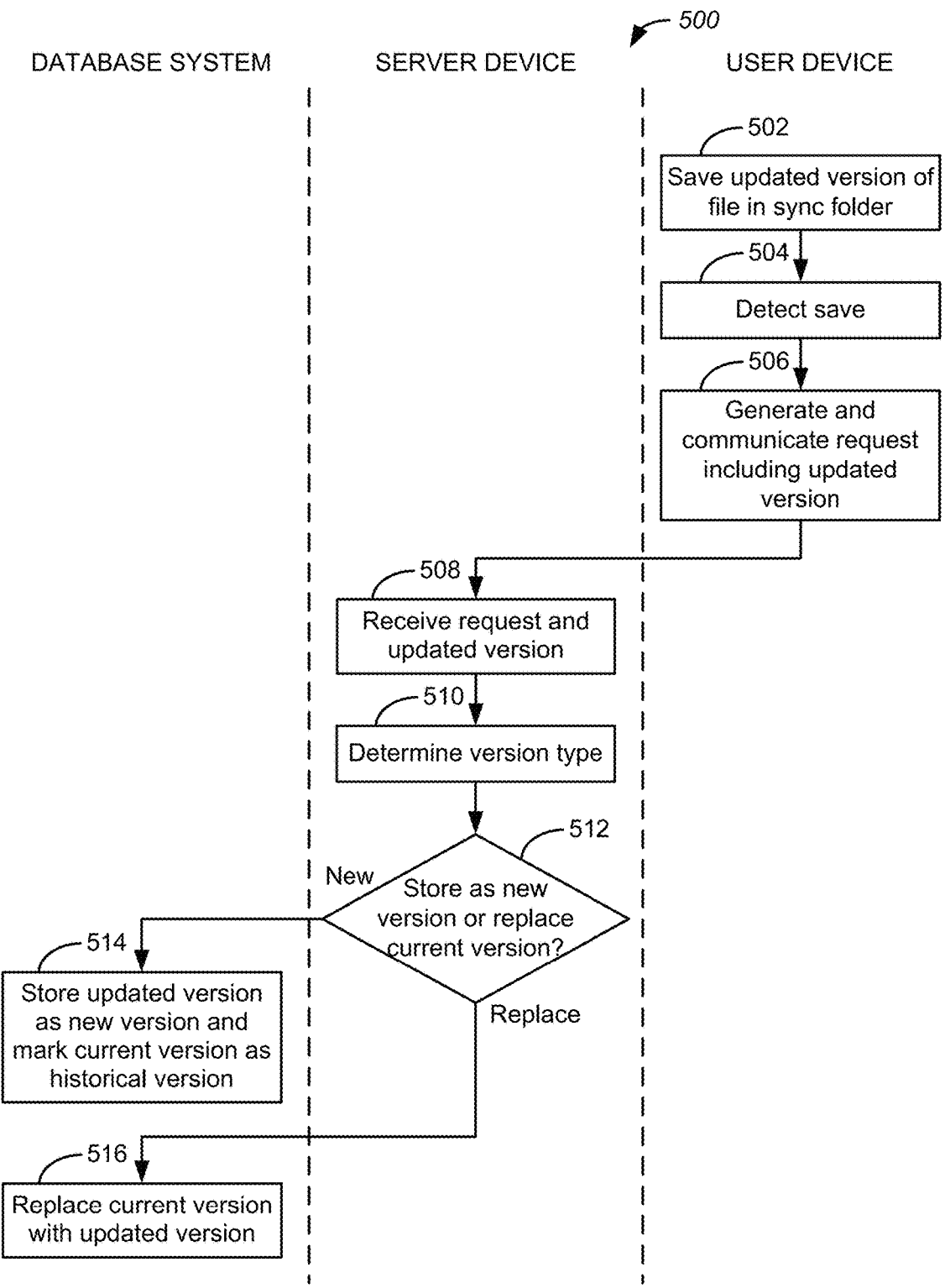
FIG. 5 shows a timing diagram illustrating an example of a computer-implemented process flow for storing updated and historical versions of a file in a system responsive to changes made by a user at a remote computing device according to some implementations.

FIG. 5 shows a timing diagram illustrating an example of a computer-implemented process flow 500 for storing updated and historical versions of a file in a system responsive to changes made by a user at a remote computing device according to some implementations. As used herein, the term "file" generally refers to a collection of one or more different versions of a file (for example, a current version and one or more historical versions). In some implementations, the process flow 500 begins in block 502 when the user saves an updated version of a file in the sync folder within the user's computing device. The sync engine detects the save in block 504 and, responsive to the detection, generates and communicates (or causes to be communicated) a request to the application server 100 in block 506. For example, the sync engine can cause the web browser of the user's computing device to transmit the request via one or more wired or wireless networks to the application server 100 (the terms "communicate" and "causes to be communicated" are used interchangeably herein where appropriate unless otherwise indicated). In some implementations, the request includes the entire updated version of the file saved in the user's sync folder.

The versioning API executing within the application server 100 receives the request and the updated version in block 508 and identifies or determines a version type of the updated version in block 510. In some implementations, the versioning API then determines in block 512 whether to store the updated version as a new version in the tenant database 22 or to replace a current version of the file with the updated version. If the versioning API determines to store the updated version as a new version, the versioning API then, in block 514, stores (or causes to be stored) the updated version of the file in the tenant database 22 as a new version (the terms "stores" and "causes to be stored" are used interchangeably herein where appropriate unless otherwise indicated). Also in block 514, the versioning API preserves and marks the current version of the file stored in the tenant database 22 as a historical version. Alternatively, if the versioning API determines in block 512 to replace the current version with the updated version, the versioning API then, in block 516, replaces (or causes to be replaced) the current version of the file in the tenant database 22 with the updated version (the terms "replaces" and "causes to be replaced" are used interchangeably herein where appropriate unless otherwise indicated). In some implementations, replacing the current version with the updated version includes deleting the current version from the tenant database 22 and storing the updated version in the same or a different location as the deleted current version in the tenant database 22.

Replacing a current version with an updated version can be advantageous, for example, to utilize memory resources in the tenant database 22 more efficiently. For example, if a new version of a file is generated and stored in the tenant database 22 each time a user makes a change to and saves the file in the sync folder, then significant amounts of memory can be inefficiently used in the tenant database 22 in storing multiple versions of the file that may have only minor differences. It can be desirable to track and preserve an audit trail of important, significant or periodic revisions to a file (for example, after certain stages of a draft document are complete or as certain decisions concerning the future of the document are made). On the other hand, there also are typically many revisions that may be deemed to be only minor and unworthy of tracking or preserving. For example, it can be desirable to preserve certain historical versions of the file in the tenant database 22 so that, if one or more revisions are later rejected, or one or more deletions are later to be reincorporated, the authoring user or another authorized user can restore an earlier historical version as the current version, incorporate portions of one or more historical versions in the current version, or replace portions of the current version with portions of one or more historical versions. However, if a user frequently saves the file in the sync folder even when only minor changes are made (for example, saving the file after each change, no matter how minor), then significant memory can be used in storing a new version after each save. This can be especially undesirable in multi-tenant implementations, for example, in which users or their respective organizations are allotted finite memory resources (at least without paying for additional memory resources).

In some implementations, each version of a file stored in the tenant database 22 includes the name of the file, or the name of the updated version if the updated version has a different name than the name of the original file (or "first version"). In some implementations, each version of a file stored in the tenant database 22 includes a date and timestamp indicating when the version was saved by the user, or alternatively, when the version was received by the versioning API or stored in the tenant database 22. In some implementations, each version of a file stored in the tenant database 22 also includes an identifier of the user (for example, the user's UserID) who is responsible for the updates in or to the respective version. In some implementations, each version of a file stored in the tenant database 22 also includes a unique identifier of the sync engine ("SyncID") responsible for generating and communicating the request and version to the versioning API. In addition to, or instead of, the SyncID, each version of the file stored in the tenant database can include an identifier of the user's computing device ("DeviceID").

In some implementations, the sync engine includes the UserID and the SyncID in the request communicated in block 506. In some other implementations, when a user logs in to the database system 16 from a computing device, the application server 100 assigns a unique identifier to the user's session (a "SessionID") that is subsequently included in some or all of the requests and responses communicated between the application server 100 and the user's computing device, or more particularly, the sync engine. In some implementations, the SessionID is a combination of the user's UserID and the sync engine's SyncID (also referred to hereinafter as a "CombID"). In this way, the versioning API can determine which user and sync engine (or computing device) are responsible for the updated version received in block 508 and store (or otherwise relate) this information with the updated version of the file in the tenant database 22.

The combination of a UserID and a SyncID (the CombID) can be advantageous in scenarios in which a single user makes changes to a file from multiple computing devices, or in which one or more collaborating coauthoring users each make changes to a file and generate different updated versions of the file. In some implementations, it can be useful or necessary for the versioning API to differentiate or reconcile the updated versions of a file generated by multiple authoring users and multiple computing devices such that all useful or desired updated versions are stored in the tenant database 22.

For example, in some implementations, if an authorizing user is concurrently working on a file (whether actually simultaneously or intermittently over a duration of time) from two or more different computing devices (and different sync engines), the versioning API can store the last known updated version generated using a first one of the computing devices, and similarly, the versioning API can store the last known updated version generated using a second one of the computing devices. In this way, both updated versions can be stored in the tenant database 22 and neither replaces the other. In other words, the versioning API does/will not replace a version created by the authoring user using one computing device with a version created by the authoring user using any other computing device; rather, updated versions creating and uploaded by sync engines using different computing devices are stored as separate versions in the tenant database 22.

In some implementations, if two or more authorizing users are concurrently working on a file (whether actually simultaneously or intermittently over a duration of time), the versioning API can store the last known updated version generated by a first one of the authoring users, and similarly, the versioning API can store the last known updated version generated by a second one of the authoring users. In this way, both updated versions can be stored in the tenant database 22 and neither replaces the other. In other words, the versioning API does/will not replace a version created by one authoring user with a version created by any other authoring user; rather, updated versions uploaded by other users are stored as separate versions in the tenant database 22.

Thus, in some implementations, the versioning API treats the versions generated by each authoring user separately, and for each authoring user, treats the versions generated using each computing device separately, although all versions generated for the file can be stored in a single data structure such as a single data table in the tenant database 22. In other words, in some implementations, the versioning API does/will not replace a version with one CombID with a version with a different CombID. In this way, the benefits of storage reduction are achieved while also ensuring that versions updated by multiple users or from multiple computing devices are preserved.

In some implementations, the request generated by the sync engine in block 506 additionally includes a version-type field or call that specifies a type of the updated version included in the request. For example, the version-type field can indicate whether the version in the request is a "major" version or a "minor" version. In some other implementations, there can be more than two version types. In some implementations, an authoring user can specify (for example, by configuring a parameter in an automatically-applied setting beforehand, or by making the specification at the time of saving the updated version in the sync folder) whether the updated version is to be uploaded by the sync engine as a major version or a minor version. For example, when a user selects to save an updated version in the sync folder, the user can be presented with two selectable GUI elements. For example, a user can select a first one of the GUI elements that says "Upload Major Version" to cause the sync engine to mark the updated version as a major version. Similarly, a user can select a second one of the GUI elements that says "Upload Minor Version" to cause the sync engine to mark the updated version as a minor version.

In some implementations, the user also can have an option to (or may be required to) specify a reason for marking a version as major. For example, if a user selects to upload a major version, the user can be presented with a prompt or popup window that requests the user to specify a reason, whether via natural language textual characters, predetermined commands, or selecting among a plurality of predefined reasons. In some such implementations, the versioning API is capable of processing and interpreting a reason provided by a user for marking a version as major.

In some other implementations, the sync engine, by default, automatically specifies each version it uploads to the application server 100 as a minor version. In such an implementation, the user can be provided with an opportunity to override the default setting. In another implementation, the sync engine, by default, automatically specifies each version it uploads to the application server 100 as a major version. Again, in such an implementation, the user can be provided with an opportunity to override the default setting. In some implementations, the versioning API can override the authoring user's selection (or the default selection) of version type responsive to an output of a heuristic algorithm.

Some or all of the described techniques for indicating a version type for an updated version can be used or offered simultaneously such that a user can use his or her preferred method. Alternatively, the user or the user's organization can configure a preferred, standard, or default setting for enabling the user to select a version type.

In some implementations, the versioning API identifies the version type of the updated version in block 510 based on the version-type field included in the request received in block 508. In some other implementations, a server-side application such as the versioning API can additionally or alternatively determine a version type for the updated version in block 510. As described above, in some implementations, the versioning API can override the authoring user's selection (or the default selection) of version type in the request received in block 508 responsive to an output of a heuristic algorithm. In some implementations, in block 512, the versioning API processes the request and, based at least in part on the version type of the updated version in the request, determines whether to store the updated version as a new version in the tenant database 22 or to replace the current version of the file with the updated version.

In some implementations, the heuristic algorithm applied by the versioning API to make the determination in block 512 includes applying one or more of: a heuristic based on a source associated with the updated version; a heuristic based on a name of the updated version; a heuristic based on a time duration between the updated version and a current version (also referred to as a "most recent" or "last-updated" version), and a heuristic based on version type of the updated version and a version type of the current version. As described above, the versioning API can apply a different set of configurable heuristics for each user, group, record or organization. In some implementations, the versioning API also can apply a different set of configurable heuristics on a file-by-file basis, as opposed to globally across all files of a user or all files of an organization.

Figure 6:
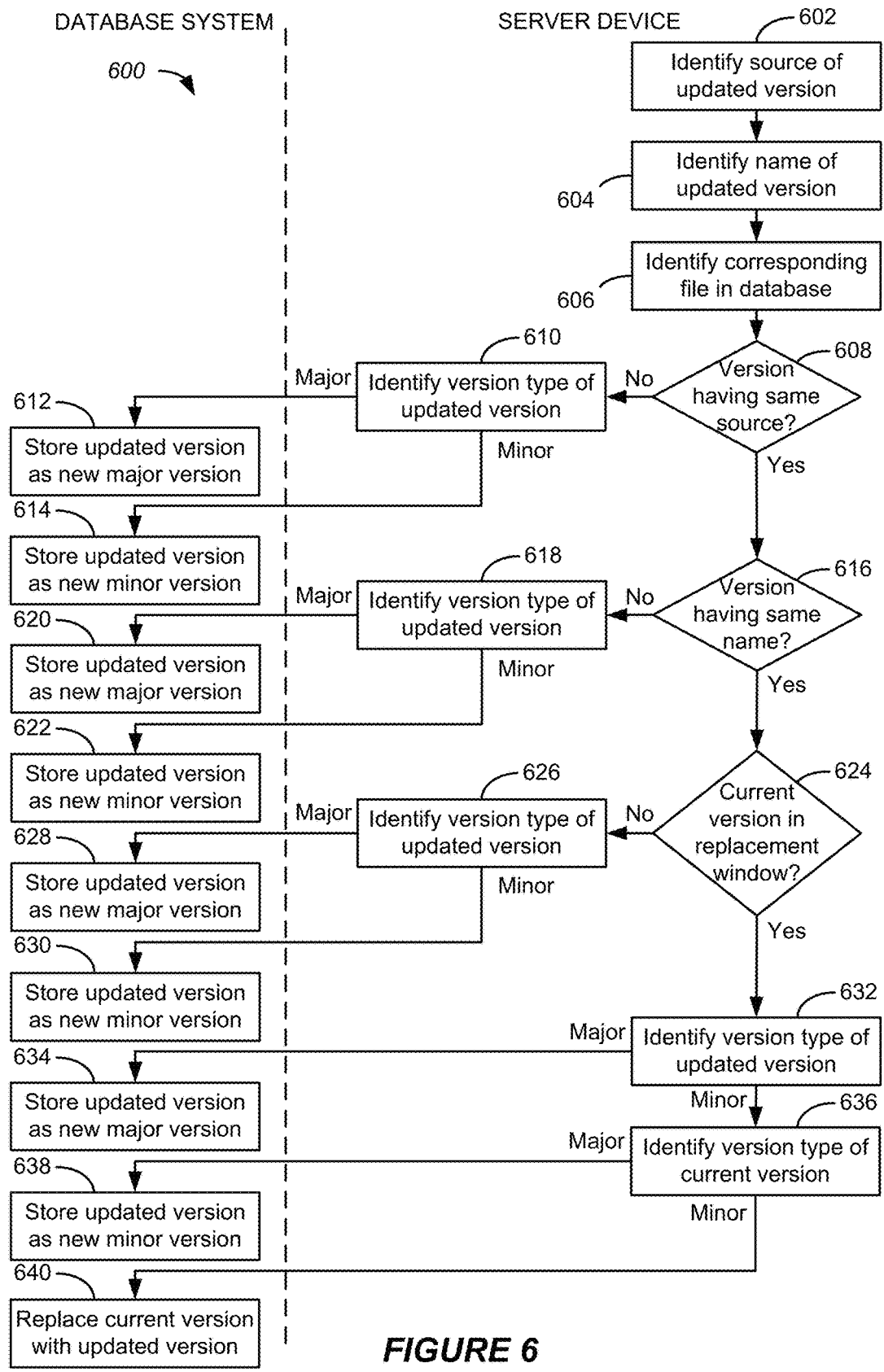
FIG. 6 shows a timing diagram illustrating an example of a computer-implemented process flow for determining whether to store an updated version of a file as a new version or to replace a current version with the updated version according to some implementations.

FIG. 6 shows a timing diagram illustrating an example of a computer-implemented process flow 600 for determining whether to store an updated version of a file as a new version or to replace a current version with the updated version according to some implementations. For example, the process flow 600 can be implemented by the versioning API to perform some or all of the blocks 510 and 512 of the process flow 500. Some of the blocks in the process flow 600 can be rearranged or not included in some other implementations (for example, based on which heuristics are to be applied by the versioning API).

In some implementations, the process flow 600 begins in 602 with identifying one or more sources of the changes in the updated version received in block 508. In some implementations, identifying the sources in 602 includes identifying the user (for example, by UserID), the sync engine (for example, by SyncID), or a combination of the user and the sync engine (for example, by CombID), or some other identifier (for example, a DeviceID or a document identifier ("DocID")). In block 604, the versioning API identifies the name of the updated version (for example, the name of the document or file). In some implementations, the versioning API identifies in block 606 the file in the tenant database 22 corresponding to the updated version based on the combination of the UserID, SyncID, and name associated with the updated version. In some other implementations, a DocID can additionally or alternatively be used to identify the corresponding file in the tenant database 22.

In some implementations, in block 608, the versioning API determines whether there is a version of the identified file in the tenant database 22 that has the same source as the updated version. If the versioning API determines that a version of the file with the same source does not exist, then, in block 610, the versioning API identifies a version type of the updated version. If the updated version is a major version then, in block 612, the versioning API stores the updated version as a new version in the tenant database 22 with a parameter, field value or other identifier indicating that the updated version is a major version. If the updated version is a minor version then, in block 614, the versioning API stores the updated version as a new version in the tenant database 22 with a parameter, field value or other identifier indicating that the updated version is a minor version.

If the versioning API determines in block 608 that a version of the file with the same source exists, then, in block 616, the versioning API determines whether there is a version of the identified file having the same source that also has the same name as the updated version. If the versioning API determines that a version of the file having the same source and the same name does not exist, then, in block 618, the versioning API identifies a version type of the updated version. If the updated version is a major version then, in block 620, the versioning API stores the updated version as a new version in the tenant database 22 with a parameter, field value or other identifier indicating that the updated version is a major version. If the updated version is a minor version then, in block 622, the versioning API stores the updated version as a new version in the tenant database 22 with a parameter, field value or other identifier indicating that the updated version is a minor version.

If the versioning API determines in block 616 that a version of the file having the same source and the same name does exist, then, in block 624, the versioning API determines whether the current version of the identified file having the same source and the same name was updated within a replacement window. The replacement window can be a predetermined or predefined duration of time such as, for example, 10 minutes, 1 hour, 1 day, or any other suitable or desirable duration of time.

If the versioning API determines in block 624 that the current version of the identified file having the same source and the same name was not updated within the replacement window, then, in block 626, the versioning API identifies a version type of the updated version. If the updated version is a major version then, in block 628, the versioning API stores the updated version as a new version in the tenant database 22 with a parameter, field value or other identifier indicating that the updated version is a major version. If the updated version is a minor version then, in block 630, the versioning API stores the updated version as a new version in the tenant database 22 with a parameter, field value or other identifier indicating that the updated version is a minor version.

If the versioning API determines in block 624 that the current version of the identified file having the same source and the same name was updated within the replacement window, then, in block 632, the versioning API identifies a version type of the updated version. If the updated version is a major version, the versioning API stores, in block 634, the updated version as a new version in the tenant database 22 with a parameter, field value or other identifier indicating that the updated version is a major version. If the updated version is a minor version, the versioning API then, in block 636, identifies a version type of the current version of the file. If the current version is a major version, the versioning API stores, in block 638, the updated version as a new version in the tenant database 22 with a parameter, field value or other identifier indicating that the updated version is a minor version. If the current version is a minor version, the versioning API replaces, in block 640, the current version with the updated version and includes with it a parameter, field value or other identifier indicating that the updated version is a minor version.

In some implementations, the duration of time associated with the replacement window is configurable by individual users or the users' respective organizations such that the duration of time is suitable or advantageous to a user's or his respective organization's needs. For example, if an organization is approaching its memory usage limit or is using more memory resources than it is allotted under its services agreement, the organization may increase the duration of time associated with the replacement window resulting in a decrease in the number of instances in which a new version is saved and an increase in the number of instances in which an updated version replaces a previous version. Similarly, if an organization finds that it rarely approaches or is far from approaching its memory usage limit and also determines that having more historical versions would or could be beneficial to the organization, the organization may decrease the duration of time associated with the replacement window resulting in an increase in the number of instances in which a new version is saved and a decrease in the number of instances in which an updated version replaces a previous version.

As described earlier, in some implementations, a user can specify a reason for marking an updated version as a major version. In some such implementations, the versioning application also can be configured to automatically store as a new major version an updated version for which a reason has been provided by the respective user.

Figure 7:
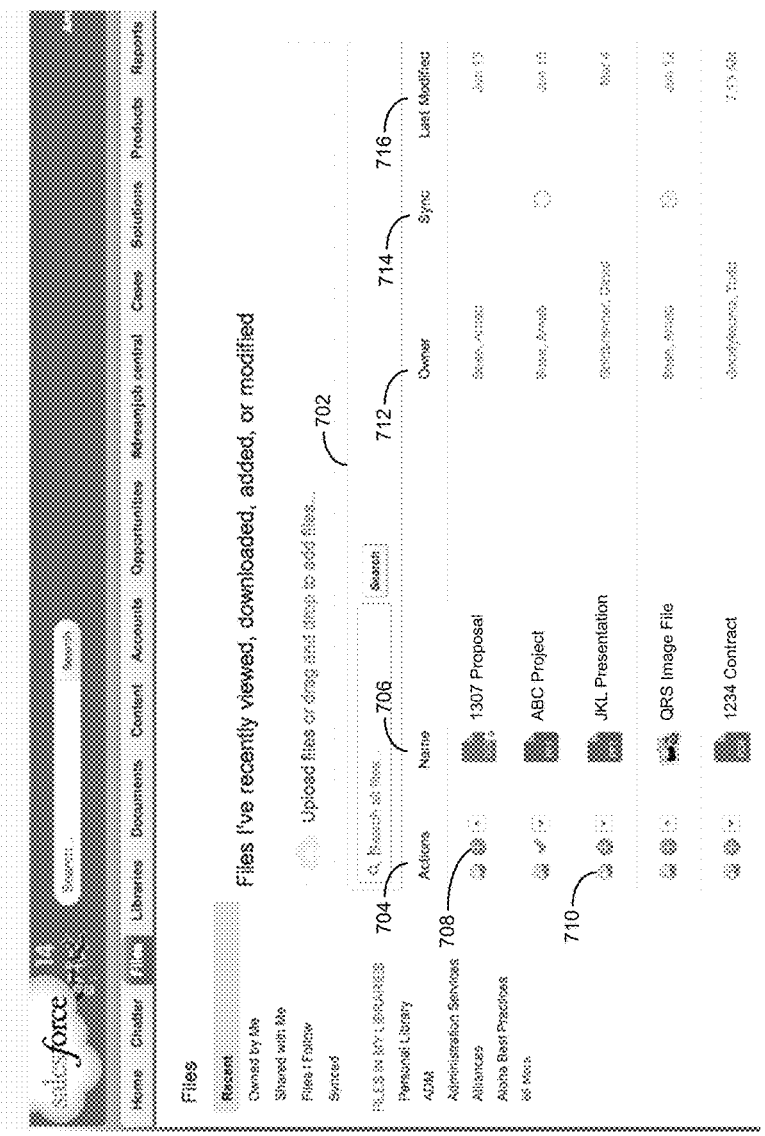
FIG. 7 shows an example of a "Files" page viewable by selecting a "Files" tab element from, for example, a user's home page according to some implementations.

FIG. 7 shows an example of a "Files" page viewable by selecting a "Files" tab element from, for example, a user's home page according to some implementations. The Files page can list or otherwise display the files a user is working on or has worked on in a section 702 of the page. In some implementations, the files are displayed chronological by a last-modified date, alphabetically by name, or otherwise arranged in a manner the user desires. In some implementations, the section 702 includes a column 704 that displays actions a user can take with respect to a file named and presented in a second column 706. For example, a user can select to download a file by selecting a sync button 708. A user also can select to preview a file (for example, in a pop-up window or a separate tab or other page) by selecting a preview button 710. The section also includes a column 712 that indicates the owner of the file, a column 714 that indicates whether the file is synced, and a column 716 that indicates when the file was last updated (or "modified").

Figure 8:
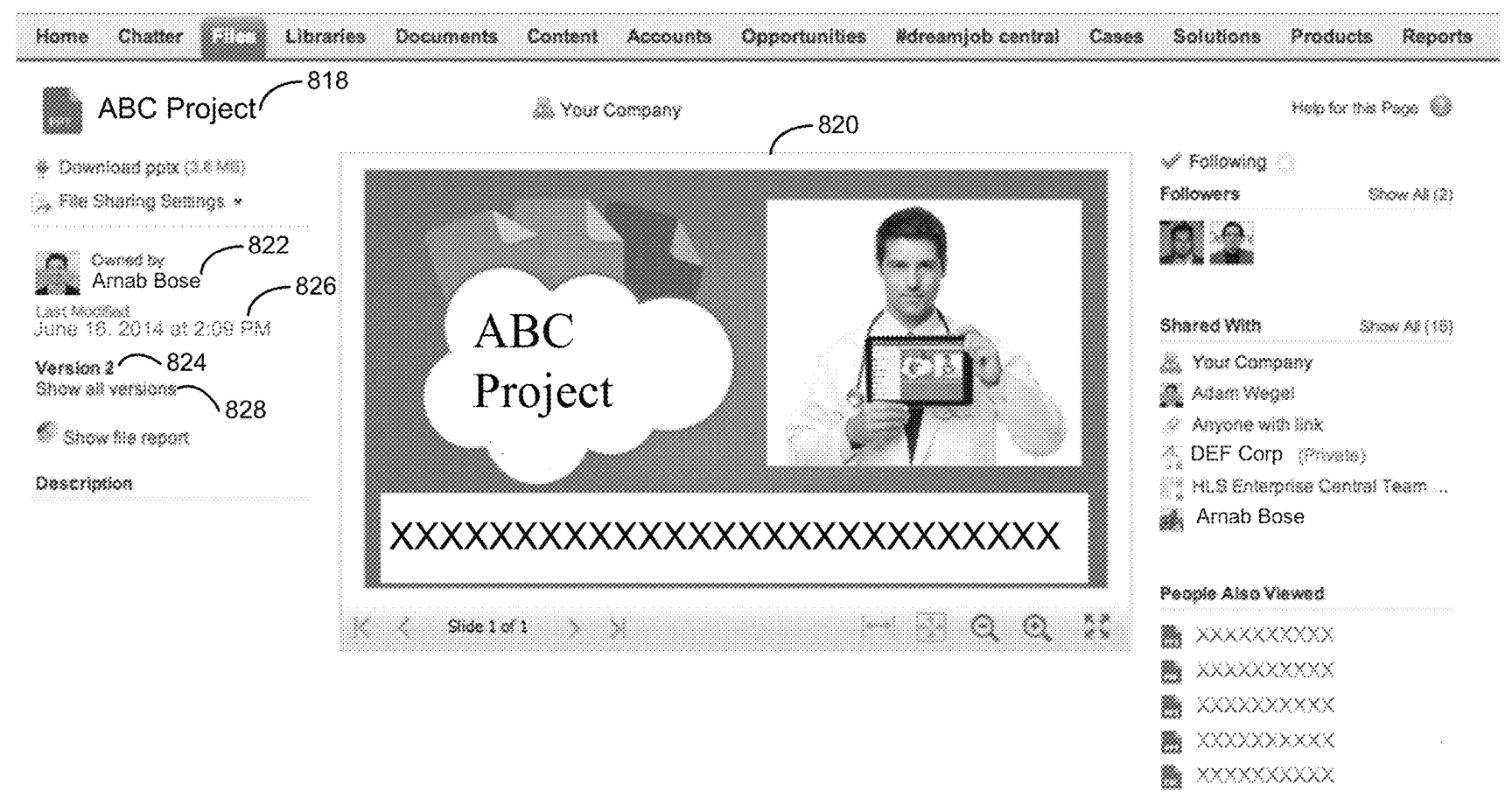

In some implementation, when the user clicks on or otherwise selects a particular file in the Files page, a "File Details" page is rendered that displays a preview of the current version of the file and which enables the user to navigate through different pages of the file. FIG. 8 shows an example of a "File Details" page viewable by selecting a file in the Files page of FIG. 7 according to some implementations. The File Details page displays the name of the file in a title section 818, a preview of the file in a preview section 820, and an owner of the file in a owner section 822. The File Details page also can display other details concerning the file including information about the current version such as, for example, a version number in a section 824. The File Details page also can include the date and time the current version was saved, uploaded, received or stored in a section 826. In some implementations in which the authoring user of the current version is different than the owner of the file, the authoring user responsible for the current version also can be displayed. In some implementations, the File Details page also includes an indication of whether the version is major or minor. In some implementations, the File Details page also includes a "Show All Versions" GUI element 828 that, when selected, displays a table, list or other presentation of the current and historical versions of the file that have been processed by the versioning API and stored in the tenant database 22.

Figure 9:
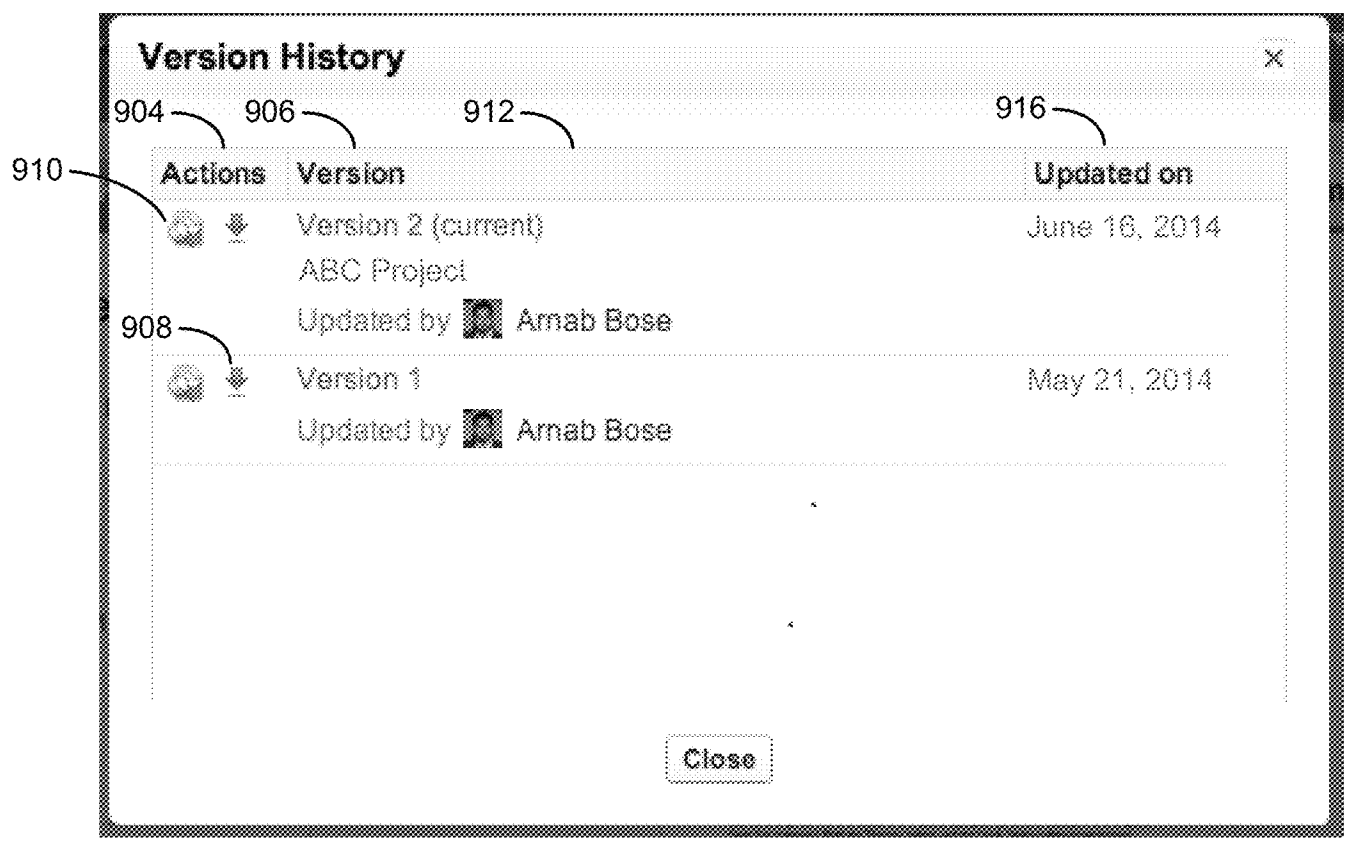

FIG. 9 shows an example of a version history window viewable by selecting a "Show all Versions" GUI element in the File Details page of FIG. 8 according to some implementations. In some implementations, the versions are displayed chronological by a last-updated date. In some implementations, a user also can sort the versions for display by the owner or author of the version. In some implementations, the Version History window includes only those versions of a file that the user is an author of, that have been shared with the user, or which are otherwise accessible by the user in one or all of the Files page, the File Details page and the Version History window, or a respective group or record page. In some implementations, the Version History window includes a column 904 that displays actions a user can take with respect to a version named and presented in a second column 906. For example, a user can select to download a version by selecting a sync button 908. In some implementations, a user also can select to preview a version (for example, in a pop-up window or a separate tab or other page) by selecting a preview button 910. In some implementations, the version preview rendered by the web browser is editable, in some other implementations, it is not. The Version History window also includes a column 912 that indicates the user responsible for the authoring the respective version or the changes in the respective version. The Version History window also can include a column 916 that indicates when the file was last modified.

As described above, a user can download a current or historical version to the user's computing device. For example, the user can download a current or historical version for storage in the sync folder or to open the downloaded version in a suitable client-side application (with or without storing the downloaded version in the sync folder first). In some implementations, while viewing the Files page or the File Details page, a user can select a sync button to automatically download the current version of the file associated with the sync button. In some implementations, while viewing the Version History window, a user can select a sync button to download the particular version of the file next to the sync button.

In some implementations, if the sync folder stored in the user's computing device already contains a version of the downloaded file, the downloaded version automatically replaces the version in the sync folder. In some other implementations, a prompt is displayed when the user selects to download the version or when the user selects to save the downloaded version. For example, the prompt can request input from the user as to whether the downloaded version should replace the version in the sync folder or whether to save the downloaded version with a different name or in a different location. In some implementations, when downloaded, an appropriate client-side application (for example, Microsoft® Word) automatically opens the downloaded version in such application. In some other implementations, a prompt is displayed to the user requesting the user to select whether to save or open the downloaded version.

In some implementations, when a file is uploaded to the application server 100 for the first time (that is, the first version of the file), it is by default private to the original authoring user (the owner of the file). In some such implementations, a private file is viewable, downloadable, or editable only by the original authoring user. In some implementations, a private file, or private version of the file, is indicated as such in the File Details page (for example, a "Lock" icon can be displayed in the File Details page next to each private version or private file). In some implementations, a private version is made available to be viewed and downloaded to other users only after the original authoring user has shared the version with such other users or is otherwise made public or available to other users. For example, as described above, a user can share a file with a group, with a record, or with one or more individually selected users. In some implementations, users to whom a file has been shared are automatically granted access and collaborative editing rights that enable them to preview the file, download the file, update the file and store the file in their respective sync folders (and as such become authoring users). In this way, updated versions of the file generated by these additional authoring users can be uploaded in requests from their respective sync engines and stored in the tenant database 22.

In some implementations, while a file or a version of the file is private, the versioning API can be more liberal in replacing current or previous versions as opposed to creating new versions (that is, the versioning API will be more likely to replace a current version with an updated version). For example, the replacement window for a private file can be relatively longer for a private file as compared with the replacement window for a shared or public file. By the same token, after a file or a version of the file is shared, the versioning API can be more conservative in replacing current or previous versions as opposed to creating new versions (that is, the versioning API will be more likely to store an updated version as a new version). Additionally, in some implementations, when a minor version of a file is shared for the first time, the versioning API converts the version type of the version from minor to major.

As described above, when a user saves a file or updated version of the file in a sync folder, the sync engine generates and communicates a request including the updated version to the application server 100 responsive to the detection of the save. However, there are scenarios in which such an immediate request cannot be made; for example, when the user saves a file in the sync folder while the user's computing device is offline. In such offline scenarios, the sync engine can still generate a request after each save. In some such implementations, when the user's computing device becomes online, the previously uncommunicated requests are then sent to the application server 100 and the versioning API (some implementations also can require the user to be logged in to the system 16). In some other implementations, as a user makes changes to and saves a file in the sync folder while the computing device is offline, the sync engine maintains only a single request that is revised after each save to include only the last-modified updated version reflecting all of the changes made since the computing device was last online. In some such implementations, when the user's computing device becomes online, the previously uncommunicated request is then sent to the application server 100 and the versioning API (some implementations also can require the user to be logged in to the system 16).

In some implementations, to guard against reaching or exceeding a user's or an organization's allotted memory resources, a purging operation can be performed. In some such implementations, there is a limit to how many versions can be stored for a given file. When that limit is reached, and a new updated version is to be stored, the versioning API deletes the oldest minor version. If a point is reached in which all of the minor versions are deleted, the versioning API can then delete the oldest major version. Additionally or alternatively, in some implementations, a purging operation can be performed before a version number limit is reached. For example, in instances where a relatively large version (in terms of databytes) is to be stored, and the storage of the version would reach or exceed a predetermined memory usage limit, or reach or exceed the total memory resources allocated (or a fraction thereof), the versioning API deletes the oldest minor version as just described. It is also to be understood that, in some implementations, a user or an administrator of an organization also can preemptively or proactively delete historical versions via the File Details page or the Version History window. For example, a user can manually purge an older or no longer useful historical version by clicking or selecting a "purge" or "delete" button next to or otherwise associated with the respective version.

In some organizations, collaboration on a file is often, and sometimes predominantly, performed by users associated with a particular group within the organization. However, in some implementations, files also can be posted, published, stored or shared in shared libraries. In some such implementations, the files or versions shared in the libraries are more finalized or nearer to completion. For example, files or versions of files can be shared in libraries when such files or versions are in late stages of development; that is, close to being ready for submission for approval by senior level management or for submission to third parties, such as customers of the organization or sellers that provide supplies, products or services to the organization. In other words, versions shared in libraries may be more ready for external communication or collaboration (outside of the organization) as opposed to versions shared in groups, which can be in earlier stages and made available only for internal collaboration (within the organization). In some implementations, for files or versions of files stored in libraries, the versioning API is more conservative in replacing previous versions as opposed to creating new versions (that is, the versioning API is more likely to store an updated version as a new version). For example, it may be more important to maintain an audit trail for files or versions of files stored in libraries as opposed to files shared with groups because it can be desirable to have more granularity to view or restore historical versions of such later-stage files in libraries.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
processing a first request comprising a first updated version of a file, a selection of a first version type and a first indication of a first user permission level, the file comprising a current version and a plurality of historical versions;
identifying the first version type of the first updated version of the file as a minor version of the file based on the first user permission level;
processing a second request comprising a second updated version of the file different from the first updated version of the file, a second user selection of a second version type and a second indication of a second user permission level, the second indication of the second user permission level being a higher level than the first permission level;
identifying a first current version of the file stored in a database of the database system;
identifying the second version type of the second updated version of the file as a major version of the file based on the second user permission level, the major version of the file representing a new version of the file to replace the first current version;
designating the first current version of the file as a first one of the historical versions; and
storing the second updated version of the file as a second current version.

2. A computer-implemented method comprising:
processing a first request comprising a first updated version of a file, a selection of a first version type and a first indication of a first user permission level, the file comprising a current version and a plurality of historical versions;
identifying the first version type of the first updated version of the file as a minor version of the file based on the first user permission level;
processing a second request comprising a second updated version of the file different from the first updated version of the file, a second user selection of a second version type and a second indication of a second user permission level, the second indication of the second user permission level being a higher level than the first permission level;
identifying a first current version of the file stored in one or more storage devices;
identifying the second version type of the second updated version of the file as a major version of the file based on the second user permission level, the major version of the file representing a new version of the file to replace the first current version;
designating the first current version of the file as a first one of the historical versions; and
storing the second updated version of the file in the one or more storage devices based as a second current version.

3. A computer program product comprising program code executed by one or more processors when retrieved from a non-transitory computer-readable storage medium, the program code comprising instructions configurable to cause:
processing a first request comprising a first updated version of a file, a selection of a first version type and a first indication of a first user permission level, the file comprising a current version and a plurality of historical versions;
identifying the first version type of the first updated version of the file as a minor version of the file based on the first user permission level;
processing a second request comprising a second updated version of the file different from the first updated version of the file, a second user selection of a second version type and a second indication of a second user permission level, the second indication of the second user permission level being a higher level than the first permission level;

identifying a first current version of the file stored in one or more storage devices;

identifying the second version type of the second updated version of the file as a major version of the file based on the second user permission level, the major version of the file representing a new version of the file to replace the first current version;

designating the first current version of the file as a first one of the historical versions; and storing the second updated version of the file in the one or more storage devices based as a second current version.

4. The system of claim 1, wherein identifying the second version type of the second updated version of the file as indicating the major version of the file comprises:

determining whether there are two or more version types associated with the file.

5. The system of claim 1, the database system configurable to cause:

identifying a source of the second updated version, and identifying a source of the first current version; and wherein the storing is based on the source of the second updated version and the source of the first current version.

6. The system of claim 1, the database system configurable to cause:

identifying a name of the second updated version, and identifying a name of the first current version; and wherein the storing is based on the name of the second updated version and the name of the first current version.

7. The system of claim 1, the database system configurable to cause:

identifying a timestamp of the second updated version, and identifying a timestamp of the first current version; and wherein the storing is based on the timestamp of the second updated version and the timestamp of the first current version.

8. The method of claim 2, wherein identifying the second version type of the second updated version of the file as indicating the major version of the file comprises:

determining whether there are two or more version types associated with the file.

9. The method of claim 2, the method further comprising:

identifying a source of the second updated version, and identifying a source of the first current version; and wherein the storing is based on the source of the second updated version and the source of the first current version.

10. The method of claim 2, the method further comprising:

identifying a name of the second updated version, and identifying a name of the first current version; and wherein the storing is based on the name of the second updated version and the name of the first current version.

11. The method of claim 2, the method further comprising:

identifying a timestamp of the second updated version, and identifying a timestamp of the first current version; and wherein the storing is based on the timestamp of the second updated version and the timestamp of the first current version.

12. The computer program product of claim 3, wherein identifying the second version type of the second updated version of the file as indicating the major version of the file comprises:

determining whether there are two or more version types associated with the file.

13. The computer program product of claim 3, the instructions further configurable to cause:

identifying a source of the second updated version, and identifying a source of the first current version; and wherein the storing is based on the source of the second updated version and the source of the first current version.

14. The computer program product of claim 13, the instructions further configurable to cause:

identifying a source of the second updated version includes identifying a user responsible for the second updated version;

identifying a source of the first current version includes identifying a user responsible for the first current version; and storing the second updated version when the source of the second updated version is different than the source of the first current version.

15. The computer program product of claim 3, the instructions further configurable to cause:

identifying a name of the second updated version, and identifying a name of the first current version; and wherein the storing is based on the name of the second updated version and the name of the first current version.

16. The computer program product of claim 3, the instructions further configurable to cause:

identifying a timestamp of the second updated version, and identifying a timestamp of the first current version; and wherein the storing is based on the timestamp of the second updated version and the timestamp of the first current version.

17. The system of claim 5, the database system configurable to cause:

identifying a source of the second updated version includes identifying a user responsible for the second updated version;

identifying a source of the first current version includes identifying a user responsible for the first current version; and storing the second updated version when the source of the second updated version is different than the source of the first current version.

18. The system of claim 6, wherein when the name of the second updated version is different than the name of the first current version.

19. The system of claim 7, wherein the storing based on the timestamp includes identifying a difference in time between the timestamp of the second updated version and the timestamp of the first current version that is greater than a predefined duration.

20. The method of claim 9, the method further comprising:

identifying a source of the second updated version includes identifying a user responsible for the second updated version;

identifying a source of the first current version includes identifying a user responsible for the first current version; and storing the second updated version when the source of the second updated version is different than the source of the first current version.

21. The method of claim 10, herein when the name of the second updated version is different than the name of the first current version.

22. The method of claim 11, wherein the storing based on the timestamp includes identifying a difference in time between the timestamp of the second updated version and the timestamp of the first current version that is greater than a predefined duration.

23. The computer program product of claim 15, wherein when the name of the second updated version is different than the name of the first current version.

* * * * *